Figure 1:
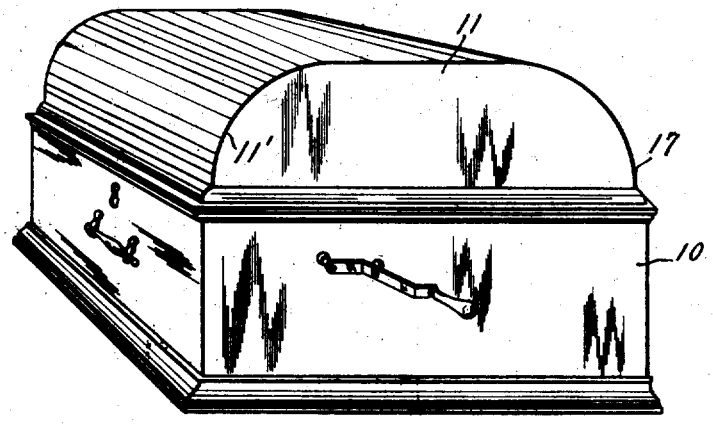

V. E. D'URSO.

SOUND AMPLIFIER FOR PHONOGRAPHS.

APPLICATION FILED OCT. 24, 1911.

Reissued Mar. 5, 1912.

13,378

3 SHEETS—SHEET 1.

WITNESSES

W. Klink

S. Birnbaum

INVENTOR

Vito Ettore D'Urso by Sigmund Herzog his ATTORNEY

V. E. D'URSO.

SOUND AMPLIFIER FOR PHONOGRAPHS.

APPLICATION FILED OCT. 24, 1911.

Reissued Mar. 5, 1912.

13,378.

3 SHEETS—SHEET 2.

WITNESSES

H. Klick

S. Birnbaum

INVENTOR

Vito Ettore D'Urso by Sigmund Herzog his ATTORNEY

V. E. D'URSO.

SOUND AMPLIFIER FOR PHONOGRAPHS.

APPLICATION FILED OCT. 24, 1911.

Reissued Mar. 5, 1912.

13,378.

3 SHEETS—SHEET 3.

WITNESSES

W. Klink

S. Birnbaum

INVENTOR

Vito Ettore D'Urso by Sigmund Herzog his ATTORNEY

UNITED STATES PATENT OFFICE.

VITO ETTORE D'URSO, OF NEW YORK, N. Y.

SOUND-AMPLIFIER FOR PHONOGRAPHS.

Specification of Reissued Letters Patent. Reissued Mar. 5, 1912.

13,378.

Original No. 956,235, dated April 26, 1910. Serial No. 521,247. Application for reissue filed October 24, 1911. Serial No. 656,553.

*To all whom it may concern.*

Be it known that I, VITO ETTORE D'URSO, a subject of the King of Italy, and a resident of the city of New York, in the county of New York and State of New York, have invented certain new and useful Improvements in Sound-Amplifiers for Phonographs, of which the following is a specification.

The present invention relates to phonographs, and more particularly to a device for amplifying the sound resulting from the contact of the reproducer with the record.

Ordinarily there is used in connection with a reproducer of phonographic instruments a horn or similar device for amplifying the sound emanating from the reproducer. Such devices must necessarily be supported with reference to the disk or cylinder record, and owing to uncertain balance may affect the reproduction of the sound, causing improper action of the reproducer and a scarring of the record. Furthermore such horns, as have been commonly used, accentuate the mechanical sounds of the instrument and give a more or less "brassy" or "tinny" effect to the reverberations induced by the reproducer which passes over the record. Moreover, such devices are cumbersome and require adjustment with respect to the instrument, and must be applied to or removed from the instrument for the purposes of ordinary transportation.

One of the objects of the present invention is to provide a simple and compact device in which means arranged within the casing together with parts of the inclosing casing may be utilized as a sound amplifier.

Another object of the invention is to produce a device which will dispense with the ordinary horn type of amplifiers, which are usually arranged outside of the casing, and secure the necessary amplification of sound by utilizing a direct channel for the transmission of sound from the disk or record through the inclosing casing of the device.

A further object of the invention is to provide a casing for the mechanism of the instrument, which, in normal position, will inclose the parts of the mechanism, and when opened for use will provide an additional amplifying or sound board effect, comprising a surface to which the sound waves conveyed by the main amplifying means are directed and by which the same are smoothly deflected.

With these and other objects in view, which will more fully appear as the nature of the invention is better understood, the same consists in the combination, arrangement and construction of parts hereinafter fully described, pointed out in the appended claims and illustrated in the accompanying drawings, it being understood that many changes may be made in the size and proportion of the several parts and details of construction without departing from the spirit or sacrificing any of the advantages of the invention.

One of the many possible embodiments of the invention is illustrated in the accompanying drawings, in which:—

Figure 2:
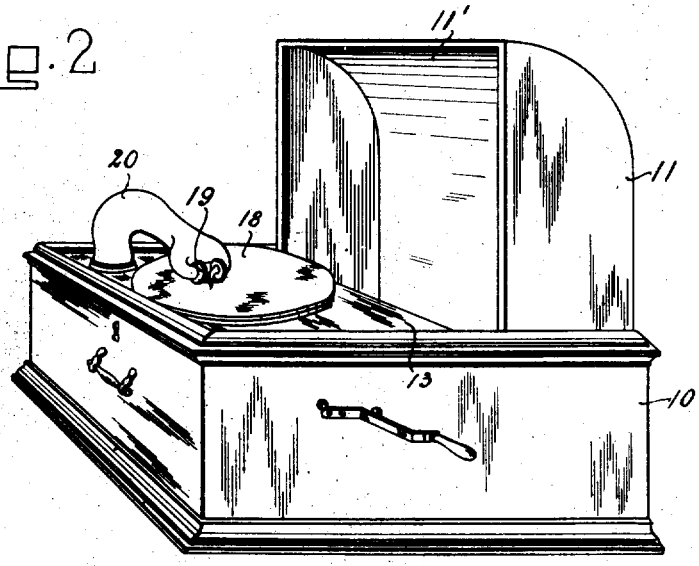
Figure 3:
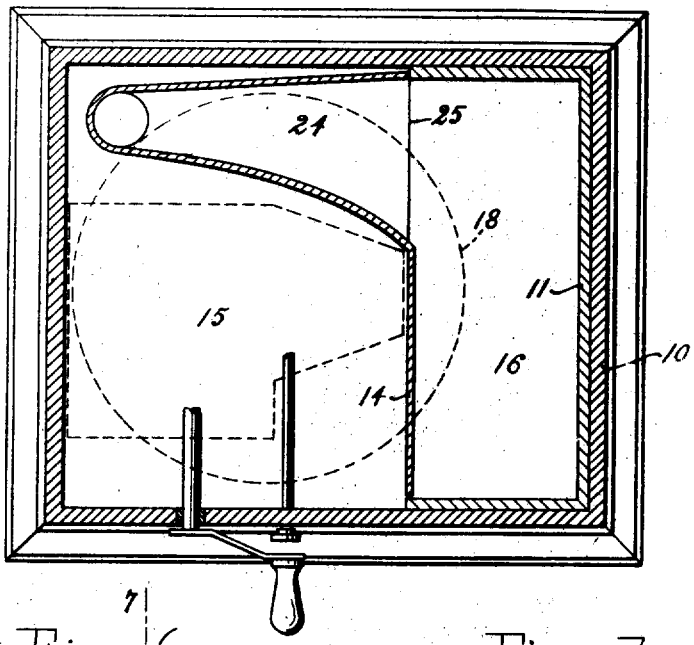
Figure 6:
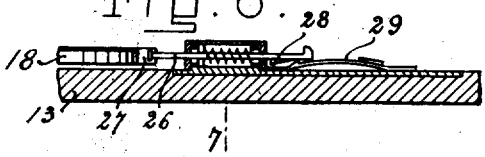
Figure 7:
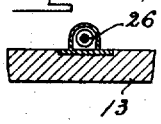
Figure 8:
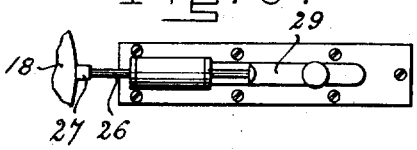
Figure 4:
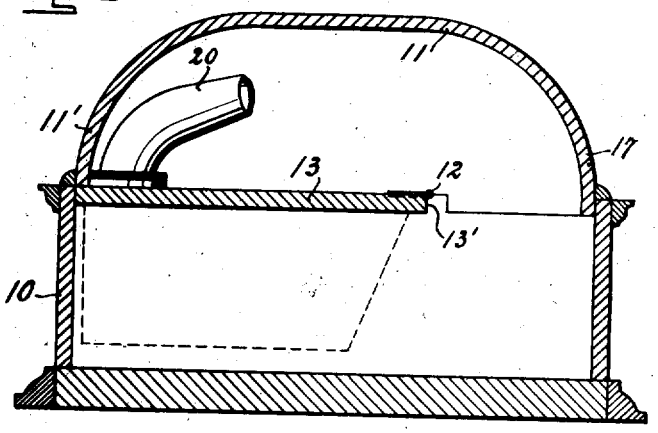
Figure 5:
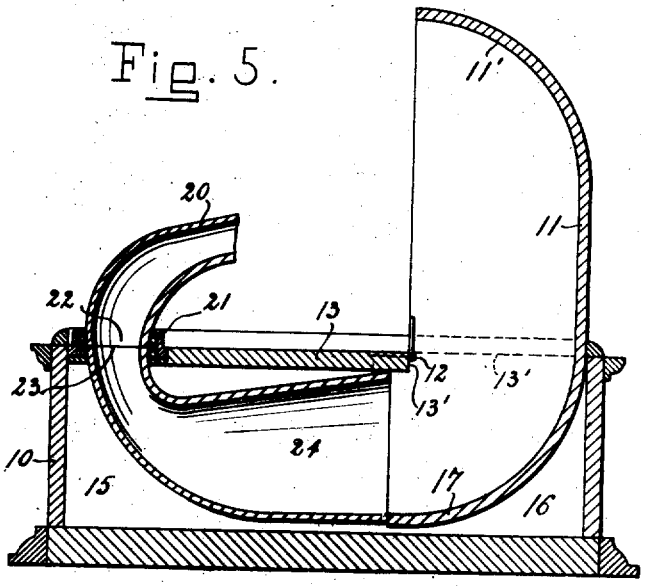

Figure 1 is a perspective view of a device constructed in accordance with the present invention in its closed position; Fig. 2 is a similar view of the apparatus in its open position; Fig. 3 is a horizontal section taken through Fig. 2, certain parts being broken away to more clearly show the invention; Fig. 4 is a central transverse section taken through the device in its closed position; Fig. 5 is a similar section through the device in its open position; Fig. 6 is a section taken through the stop for the record, Fig. 7 is a section taken on line 7—7 of Fig. 6; and Fig. 8 is a plan view of the mechanism illustrated in Fig. 6.

In the drawings, the numeral 10 indicates a casing which may be of ordinary rectangular form as shown herein, and is provided with a cover 11, hinged at 12, 12 to the bed- or top-plate 13 of the casing. The casing is divided by a partition 14 into two compartments, that is the compartment 15, in which are arranged the motor and the mechanism, not specifically shown herein, of the apparatus, and the compartment 16. The top-plate of the casing is provided with a rectangular opening 13′, extending throughout the width of the casing and from the hinges 12, 12 to the rear wall thereof, to permit the rear end 17 of the cover 11, when opened, to pass down into the compartment 16 for a purpose which will be hereinafter described.

The record 18, shown in the form of a disk, is actuated by a motor and mechanism of any suitable type, and coöperates with a reproducer 19, carried by a tubular supporting arm 20, which is suitably arranged upon ball bearings 21 upon the top-plate 13 of the machine. The inner end 22 of the supporting arm 20 registers with an aperture 23 in the bed-plate, from which leads a tubular conduit 24 to an aperture 25 in the partition 14, connecting thereby the interior of the supporting arm with the compartment 16 in the casing. The conduit 24 increases gradually in diameter toward the aperture 25 in the partition 14, and registers there with the end 17 of the cover 11, when the latter is in its open position. The conduit 24 is thus, in fact, a sound amplifying horn or megaphone.

It should be observed that any form of reproducer may be utilized in connection with the device herein described and, of course, the motor and mechanical parts for rotating the disks or records of whatever form may be of any desired preferred or common type.

In Figs. 6 to 8, inclusive, is illustrated a form of a stop device for the record, which may be conveniently used in connection with the mechanism. This stop device consists of a plunger 26, having a face 27, adapted to come into or to be removed from contact with the supporting plate of the record. One end of the plunger is provided with a latch 28, which coöperates with a spring latch 29, and holds the plunger 26 in either of its positions of adjustment.

The operation of the device is as follows: When the cover is in its open position, it forms a continuation of the tubular conduit 24. When the operating mechanism of the machine is started, the sound waves, passing from the hollow supporting arm 20 into the horn or megaphone 24, will be directed by the latter to the inner face of the curved rear end of the cover 11. This surface will act as a deflecting surface, and direct the sound waves either toward the open end of the cover or toward the front end 11′ thereof, which latter will also act as a deflecting surface. Of course, it will depend upon the angle of incidence of the sound waves issuing from the horn or megaphone 24 whether said waves will be deflected once or twice. It should be observed that the horn or megaphone 24, which is entirely inclosed within the casing 10, acts as a sound conveying and amplifying means, and the cover 11 as a deflecting and additional, amplifying sound board; or in other words the megaphone 24 gives an amplifying effect which takes the place of the ordinary horn type of amplifier, and the cover 11 being curved and of the proper form, receives the sound waves and deflects the same outward, serving at the same time as a sound board or additional sound amplifying means.

What I claim is:—

1. A sound amplifier for phonographs or the like embodying a cover hinged to a main casing and having a portion thereof adapted to project inwardly into said casing when the cover is opened, a conduit arranged in the casing and opening toward the inwardly projecting portion of the cover, and a sound reproducer connected to the opposite end of said conduit.

2. In combination with a casing for a sound reproducing mechanism, a cover therefor hinged intermediate its ends, said cover having a portion adapted to project into the casing when the cover is in open position, a conduit extending through the casing and opening toward the inwardly projecting portion of the cover and a reproducer arm connecting with said conduit.

3. In combination with a sound reproducing mechanism, a casing comprising a main casing and a cover, said cover adapted when open to extend downwardly within said casing and project above said casing, a sound conveying conduit arranged in said casing and opening toward the downwardly projecting end of the cover, and a reproducer mechanism connecting with said conduit.

4. In combination with a sound-producing mechanism having a casing, and a sound-conveying conduit with a compartment connecting with said conduit, a cover hinged above said compartment and adapted to be swung as to its lower end into said compartment connecting with the conduit and a reproducer mechanism connecting with said conduit.

5. In a phonograph, the combination with a casing for a sound reproducing mechanism provided with an opening in its top portion, of a hollow reproducer supporting arm mounted thereon, a sound conducting channel communicating with said supporting arm and running through said casing toward the opening in the top of the same, and a cover adapted to project into said casing and operate as a deflector for the sound waves issuing from said sound conducting channel.

6. In a phonograph, the combination with a casing for a sound reproducing mechanism provided with an opening in its top portion, of a hollow reproducer supporting arm mounted thereon, a horn communicating with said supporting arm and running through said casing toward the opening in the top of the same, and a cover adapted to project into said casing and operate as a deflector for the sound waves issuing from said horn.

Signed at New York, in the county of New York and State of New York, this 10th day of October, 1911.

VITO ETTORE D'URSO.

Witnesses:
PASQUALE TRIPPUTI,
SIGMUND HERZOG.